United States Patent [19]

Dastin et al.

[11] Patent Number: 5,227,815
[45] Date of Patent: Jul. 13, 1993

[54] COLOR REGISTRATION TEST PATTERN

[75] Inventors: Richard M. Dastin, Fairport; Michael L. Davidson, Rochester; Richard S. Trembulak, Penfield; Timothy M. Hunter, Webster, all of N.Y.

[73] Assignee: Xerox Corporation, Stamford, Conn.

[21] Appl. No.: 755,999

[22] Filed: Sep. 6, 1991

[51] Int. Cl.⁵ .............................................. G01D 15/14
[52] U.S. Cl. .................... 346/160; 346/1.1; 346/108; 346/157; 355/203; 355/208
[58] Field of Search ............... 355/203, 208, 326, 327; 346/1.1, 108, 157, 160

[56] References Cited

U.S. PATENT DOCUMENTS

| | | | |
|---|---|---|---|
| 3,718,397 | 2/1973 | Smajo | 355/203 |
| 3,799,668 | 3/1974 | McVeigh | 355/203 |
| 4,093,960 | 6/1978 | Estes | 358/10 |
| 4,849,914 | 7/1989 | Medioni et al. | 364/526 |
| 4,878,063 | 10/1989 | Katerberg | 346/1.1 |
| 4,937,635 | 6/1990 | Paxon et al. | 355/326 |
| 5,018,213 | 5/1991 | Sikes | 382/8 |
| 5,019,859 | 5/1991 | Nash | 355/208 X |
| 5,059,990 | 10/1991 | Abreu et al. | 346/153.1 |
| 5,060,013 | 10/1991 | Spence | 355/208 |
| 5,103,260 | 4/1992 | Tompkins et al. | 355/208 |
| 5,109,252 | 4/1992 | Schott, Jr. | 355/202 |

*Primary Examiner*—Benjamin R. Fuller
*Assistant Examiner*—R. Gibson
*Attorney, Agent, or Firm*—Kenyon & Kenyon

[57] ABSTRACT

A quick and efficient method of testing the color registration on a multi-color electronic reprographic system includes the generation a latent image of a repeated basic test pattern across and down an photoconductive surface. Several images of this repeated test pattern are generated, one for each color in the reprographic system. Each test pattern is shifted a fixed amount so that the final output page displays a set of output figures. A figure of one color will be surrounded by at least one figure of each of the remaining colors of the reprographic system. Using this system a field technician can determine the level of misregistration between all of the colors.

18 Claims, 3 Drawing Sheets

```
B—M—C—Y—B—M—C—Y—B—M—C—Y—B—M—C—Y
|   |   |   |   |   |   |   |   |   |   |   |   |   |   |   |
C—Y—B—M—C—Y—B—M—C—Y—B—M—C—Y—B—M
|   |   |   |   |   |   |   |   |   |   |   |   |   |   |   |
M—C—Y—B—M—C—Y—B—M—C—Y—B—M—C—Y—B
|   |   |   |   |   |   |   |   |   |   |   |   |   |   |   |
Y—B—M—C—Y—B—M—C—Y—B—M—C—Y—B—M—C
|   |   |   |   |   |   |   |   |   |   |   |   |   |   |   |
B—M—C—Y—B—M—C—Y—B—M—C—Y—B—M—C—Y
|   |   |   |   |   |   |   |   |   |   |   |   |   |   |   |
C—Y—B—M—C—Y—B—M—C—Y—B—M—C—Y—B—M
|   |   |   |   |   |   |   |   |   |   |   |   |   |   |   |
M—C—Y—B—M—C—Y—B—M—C—Y—B—M—C—Y—B
|   |   |   |   |   |   |   |   |   |   |   |   |   |   |   |
Y—B—M—C—Y—B—M—C—Y—B—M—C—Y—B—M—C
|   |   |   |   |   |   |   |   |   |   |   |   |   |   |   |
B—M—C—Y—B—M—C—Y—B—M—C—Y—B—M—C—Y
|   |   |   |   |   |   |   |   |   |   |   |   |   |   |   |
C—Y—B—M—C—Y—B—M—C—Y—B—M—C—Y—B—M
|   |   |   |   |   |   |   |   |   |   |   |   |   |   |   |
M—C—Y—B—M—C—Y—B—M—C—Y—B—M—C—Y—B
|   |   |   |   |   |   |   |   |   |   |   |   |   |   |   |
Y—B—M—C—Y—B—M—C—Y—B—M—C—Y—B—M—C
|   |   |   |   |   |   |   |   |   |   |   |   |   |   |   |
B—M—C—Y—B—M—C—Y—B—M—C—Y—B—M—C—Y
|   |   |   |   |   |   |   |   |   |   |   |   |   |   |   |
C—Y—B—M—C—Y—B—M—C—Y—B—M—C—Y—B—M
|   |   |   |   |   |   |   |   |   |   |   |   |   |   |   |
M—C—Y—B—M—C—Y—B—M—C—Y—B—M—C—Y—B
|   |   |   |   |   |   |   |   |   |   |   |   |   |   |   |
Y—B—M—C—Y—B—M—C—Y—B—M—C—Y—B—M—C
```

B = BLACK
M = MAGENTA
C = CYAN
Y = YELLOW

```
B—M—C—Y—B—M—C—Y—B—M—C—Y—B—M—C—Y
|   |   |   |   |   |   |   |   |   |   |   |   |   |   |   |
C—Y—B—M—C—Y—B—M—C—Y—B—M—C—Y—B—M
|   |   |   |   |   |   |   |   |   |   |   |   |   |   |   |
M—C—Y—B—M—C—Y—B—M—C—Y—B—M—C—Y—B
|   |   |   |   |   |   |   |   |   |   |   |   |   |   |   |
Y—B—M—C—Y—B—M—C—Y—B—M—C—Y—B—M—C
|   |   |   |   |   |   |   |   |   |   |   |   |   |   |   |
B—M—C—Y—B—M—C—Y—B—M—C—Y—B—M—C—Y
|   |   |   |   |   |   |   |   |   |   |   |   |   |   |   |
C—Y—B—M—C—Y—B—M—C—Y—B—M—C—Y—B—M
|   |   |   |   |   |   |   |   |   |   |   |   |   |   |   |
M—C—Y—B—M—C—Y—B—M—C—Y—B—M—C—Y—B
|   |   |   |   |   |   |   |   |   |   |   |   |   |   |   |
Y—B—M—C—Y—B—M—C—Y—B—M—C—Y—B—M—C
|   |   |   |   |   |   |   |   |   |   |   |   |   |   |   |
B—M—C—Y—B—M—C—Y—B—M—C—Y—B—M—C—Y
|   |   |   |   |   |   |   |   |   |   |   |   |   |   |   |
C—Y—B—M—C—Y—B—M—C—Y—B—M—C—Y—B—M
|   |   |   |   |   |   |   |   |   |   |   |   |   |   |   |
M—C—Y—B—M—C—Y—B—M—C—Y—B—M—C—Y—B
|   |   |   |   |   |   |   |   |   |   |   |   |   |   |   |
Y—B—M—C—Y—B—M—C—Y—B—M—C—Y—B—M—C
|   |   |   |   |   |   |   |   |   |   |   |   |   |   |   |
B—M—C—Y—B—M—C—Y—B—M—C—Y—B—M—C—Y
|   |   |   |   |   |   |   |   |   |   |   |   |   |   |   |
C—Y—B—M—C—Y—B—M—C—Y—B—M—C—Y—B—M
|   |   |   |   |   |   |   |   |   |   |   |   |   |   |   |
M—C—Y—B—M—C—Y—B—M—C—Y—B—M—C—Y—B
|   |   |   |   |   |   |   |   |   |   |   |   |   |   |   |
Y—B—M—C—Y—B—M—C—Y—B—M—C—Y—B—M—C
```

B = BLACK  
M = MAGENTA  
C = CYAN  
Y = YELLOW

FIG.3

COLOR REGISTRATION TEST PATTERN

BACKGROUND OF THE INVENTION

The present invention relates generally to an improvement in the measurement of color registration in an electronic reprographic printing machine, and more particularly to a test pattern generated within the electronic reprographic printing machine that enables a field technician to quickly and efficiently verify color registration.

The marking engine of an electronic reprographic printing system is frequently an electrophotographic printing machine. In an electrophotographic printing machine, a photoconductive member is charged to a substantially uniform potential to sensitize the surface thereof. The charged portion of the photoconductive member is thereafter selectively exposed. Exposure of the charged photoconductive member dissipates the charge thereon in the irradiated areas. This records an electrostatic latent image on the photoconductive member corresponding to the informational areas contained within the original document being reproduced. After the electrostatic latent image is recorded on the photoconductive member, the latent image on the photoconductive member is developed with charged toner which is subsequently transferred to a copy sheet. The copy sheet is heated to permanently affix the toner image thereto in image configuration.

Multi-color electrophotographic printing is substantially identical to the foregoing process of black and white printing. However, rather than forming a single latent image on the photoconductive surface, successive latent images corresponding to different colors are recorded thereon. Each single color electrostatic latent image is developed with toner of a color complementary thereto. This process is repeated a plurality of cycles for differently colored images and their respective complementarily colored toner. Each single color toner image is transferred to the copy sheet in superimposed registration with the prior toner image. This creates a multi-layered toner image on the copy sheet. Thereafter, the multi-layered toner image is permanently affixed to the copy sheet creating a color copy. The developer material may be a liquid or a powder material.

In the process of black and white printing, the copy sheet is advanced from an input tray to a path internal to the electrophotographic printing machine where a toner image is transferred thereto and then to an output catch tray for subsequent removal therefrom by the machine operator. In the process of multi-color printing, the copy sheet moves from an input tray through a recirculating path internal to the printing machine where a plurality of toner images is transferred thereto and then to an output catch tray for subsequent removal. With regard to multi-color printing, a sheet gripper secured to a transport receives the copy sheet and transports it in a recirculating path enabling the plurality of different color images to be transferred thereto. The sheet gripper grips one edge of the copy sheet and moves the sheet in a recirculating path so that accurate multi-pass color registration is achieved. In this way, magenta, cyan, yellow, and black toner images are transferred to the copy sheet in registration with one another.

The quality of the final color copy or printed sheet of a multi-color electrophotographic printing system depends on the alignment of the magenta, cyan, yellow, and black images on the sheet of paper during a toner transfer stage. Color registration is a term well known in the art that refers to the level of alignment between several images. A typical color registration error is 125 microns. In other words, to have proper color registration each of the four images cannot be misaligned more than 125 microns from any other color.

The sophisticated equipment to accurately test the color registration of a color copier or printer is both large and expensive. This equipment has the capability of measuring the color registration error at any location on an image and in which direction a given color image is skewed. When testing color copiers and printers, it is typically impractical to have field technicians bring such equipment to each and every site.

Therefore, there is a need for a method and apparatus that is quick and inexpensive to measure the color registration error of a color copier or printer.

There is also a need for a method and apparatus that determines the direction of the color registration error for a given color image.

Furthermore, there is a need for a method and apparatus that determines the color registration error at any location on the image.

SUMMARY OF THE INVENTION

The deficiencies discussed above are overcome by the present invention for a color registration test pattern. Upon an input at a user interface, the electronic reprographic printing system goes into a test mode. An image processing system sends the appropriate binary data to a raster output scanner to generate several iterations of a basic test target as a latent image in a photoconductive surface. The basic test target can comprise several cross hair figures having a line width equal to the maximum registration error for the printing machine.

Several latent images are generated, one for each color in the printing system. However, each subsequent latent image is shifted by a fixed amount from the one printed previously. The latent images are each developed by an exclusive colored toner. Finally, these toner images are transferred to a support material, such as a printed page, in superimposed registration. The final printed page will have the basic test target printed throughout. If the cross hair figure is used, then the tips of each cross hair figure should adjoin the appropriate tip of each adjacent cross hair. Moreover, a cross hair figure of one color will be adjacent to at least one cross hair figure of each of the other colors in the printing system. Using this testing system, a field technician can quickly and efficiently detect a color registration error in excess of the line width of the cross hair figure. Also the exact location of the registration error can be determined anywhere on the printed page.

The above is a brief description of some deficiencies in disclosed color registration testing systems and advantages of the present invention. Other features, advantages, and embodiments of the invention will be apparent to those skilled in the art from the following description, accompanying drawings and appended claims.

BRIEF DESCRIPTION OF THE DRAWINGS

FIG. 3 is a graphical representation of the final output page from the electronic reprographic printing system of FIG. 1 using the test pattern of FIG. 2.

DETAILED DESCRIPTION

While the present invention will hereinafter be described in connection with a preferred method of use, it will be understood that it is not intended to limit the invention to that method of use. On the contrary, it is intended to cover all alternatives, modifications and equivalents as may be included within the spirit and scope of the invention as defined by the appended claims.

Figure 1:
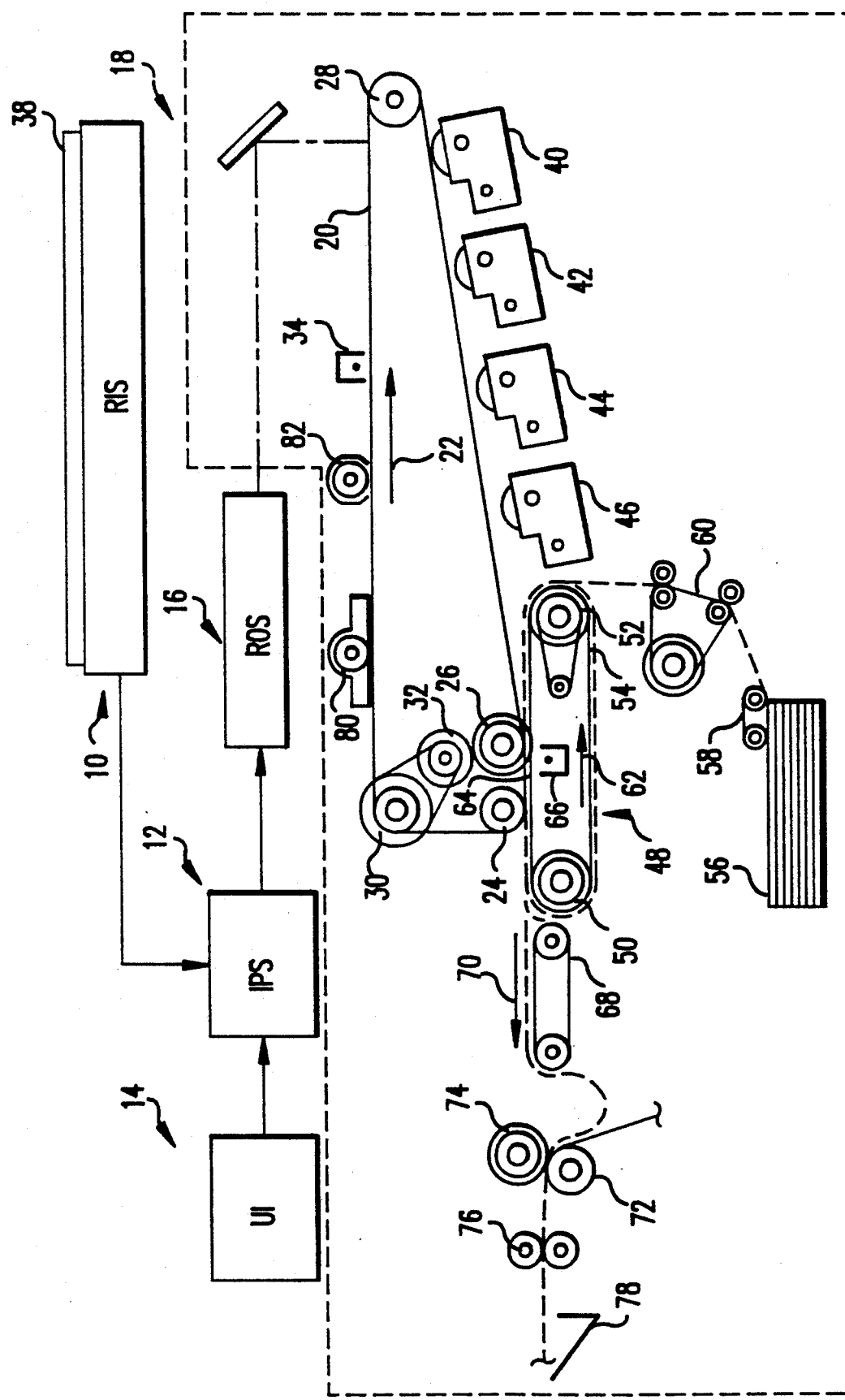
FIG. 1 is a schematic elevational view illustrating an electronic reprographic printing system incorporating the features of the present invention therein.

For a general understanding of the features of the present invention, reference is made to the drawings. In the drawings, like references have been used throughout to designate identical elements. FIG. 1 is a schematic elevational view of an illustrative electronic reprographic system incorporating the features of the present invention therein. It will become evident from the following discussion that the present invention is equally well suited for use in a wide variety of printing systems, and is not necessarily limited in its application to the particular system shown herein.

Turning initially to FIG. 1, during operation of the printing system, a multi-color original document 38 is positioned on a raster input scanner (RIS), indicated generally by the reference numeral 10. The RIS contains document illumination lamps, optics, a mechanical scanning drive, and a charge coupled device (CCD array). The RIS captures the entire original document and converts it to a series of raster scan lines and measures a set of primary color densities, i.e. red, green and blue densities, at each point of the original document. This information is transmitted to an image processing system (IPS), indicated generally by the reference numeral 12. IPS 12 is the control electronics which prepare and manage the image data flow to the raster output scanner (ROS), indicated generally by the reference numeral 16. A user interface (UI), indicated generally by the reference numeral 14, is in communication with the IPS 12. The UI enables the operator to control the various operator adjustable functions. The output signal from the UI is transmitted to IPS 12. The signal corresponding to the desired image is transmitted from IPS 12 to ROS 16, which creates the output copy image. ROS 16 lays out the image in a series of horizontal scan lines with each line having a specified number of pixels per inch. The ROS includes a laser having a rotating polygon mirror block associated therewith. The ROS exposes the charged photoconductive surface of the printer, indicated generally by the reference numeral 18, to achieve a set of subtractive primary latent images The latent images are developed with cyan, magenta, yellow, and black developer material, respectively. These developed images are transferred to a copy sheet in superimposed registration with one another to form a multi-colored image on the copy sheet. This multi-colored image is then fused to the copy sheet forming a color copy.

With continued reference to FIG. 1, printer or marking engine 18 is an electrophotographic printing machine. The electrophotographic printing machine employs a photoconductive belt 20. Preferably, the photoconductive belt 20 is made from a polychromatic photoconductive material. Belt 20 moves in the direction of arrow 22 to advance successive portions of the photoconductive surface sequentially through the various processing stations disposed about the path of movement thereof. Belt 20 is entrained about transfer rollers 24 and 26, tensioning roller 28, and drive roller 30. Drive roller 30 is rotated by a motor 32 coupled thereto by suitable means such as a belt drive. As roller 30 rotates, it advances belt 20 in the direction of arrow 22.

Initially a portion of photoconductive belt 20 passes through the charging station At the charging station, a corona generating device, indicated generally by the reference numeral 34 charges photoconductive belt 20 to a relatively high, substantially uniform potential.

Next, the charged photoconductive surface is rotated to the exposure station. The exposure station includes the RIS 10 having a multi-colored original document 38 positioned thereat. The RIS captures the entire image from the original document 38 and converts it to a series of raster scan lines which are transmitted as electrical signals to IPS 12. The electrical signals from the RIS correspond to the red, green and blue densities at each point in the document The IPS converts the set of red, green and blue density signals, i.e. the set of signals corresponding to the primary color densities of original document 38 to a set of colorimetric coordinates. The operator actuates the appropriate keys of the UI 14 to adjust the parameters of the copy. UI 14 may be a touch screen or any other suitable control panel, providing an operator interface with the system. The output signals from the UI are transmitted to the IPS. The IPS then transmits signals corresponding to the desired image to ROS 16. ROS 16 includes a laser with rotating polygon mirror blocks. Preferably, a nine facet polygon is used. The ROS illuminates the charged portion of photoconductive belt 20 at a rate of about 400 pixels per inch. The ROS will expose the photoconductive belt to record four latent images. One latent image is adapted to be developed with cyan developer material. Another latent image is adapted to be developed with magenta developer material with the third latent image being developed with yellow developer material. The fourth latent image is adapted to be developed with black developer material The latent images formed by the ROS on the photoconductive belt correspond to the signals from IPS 12.

After the electrostatic latent image has been recorded on photoconductive belt 20, belt 20 advances the electrostatic latent image to the development station. The development station includes four individual developer units generally indicated by the reference numerals 40, 42, 44 and 46. The developer units are of a type generally referred to in the art as "magnetic brush development units". Typically, a magnetic brush development system employs a magnetizable developer material including magnetic carrier granules having toner particles adhering triboelectrically thereto. The developer material is continually brought through a directional flux field to form a brush of developer material The developer particles are continually moving so as to provide the brush consistently with fresh developer material. Development is achieved by bringing the brush of developer material into contact with the photoconductive surface. Developer units 40, 42, 44, and 46 respectively, apply toner particles of a specific color which corresponds to the compliment of the specific color separated electrostatic latent image recorded on the photoconductive surface. The color of each of the toner particles is adapted to absorb light within a preselected spectral region of the electromagnetic wave spectrum. For example, an electrostatic latent image formed by discharging the portions of charge on the photoconductive belt corresponding to the green regions of the original document will record the red and blue portions as areas of relatively high charge density on photoconductive belt 10, while the green areas will be reduced to a voltage level ineffective for development. The charged areas are then made visible by having developer unit 40 apply green absorbing (magenta) toner particles onto the electrostatic latent image recorded on photoconductive belt 20. Similarly, a blue separation is developed by developer unit 42 with blue absorbing (yellow) toner particles, while the red separation is developed by developer unit 44 with red absorbing (cyan) toner particles. Developer unit 46, which contains black toner particles, is also used in developing color images and may be used to develop the electrostatic latent image formed from a black and white original document One skilled in the art will appreciate that the amount of each toner applied to the electrostatic image is based on the densities of the three colors (red, green, and blue) which determine the amount of cyan, magenta, yellow, and black toner to be applied. Each of the developer units is moved into and out of the operative position. In the operative position, the magnetic brush is closely adjacent the photoconductive belt, while, in the non-operative position, the magnetic brush is spaced therefrom. During development of each electrostatic latent image only one developer unit is in the operative position, the remaining developer units are in the non-operative position. This insures that each electrostatic latent image is developed with toner particles of appropriate color without comingling. In FIG. 1, developer unit 40 is shown in the operative position with developer units 42, 44 and 46 being in the non-operative position.

After development, the toner image is moved to the transfer station where the toner image is transferred to a sheet of support material, such as plain paper amongst others. At the transfer station, the sheet transport apparatus, indicated generally by the reference numeral 48, moves the sheet into contact with photoconductive belt 20. Sheet transport 48 has a pair of spaced belts 54 entrained about rolls 50 and 52. A gripper extends between belts 54 and moves in unison therewith. The sheet is advanced from a stack of sheets 56 disposed on a tray. A friction retard feeder 58 advances the uppermost sheet from stack 56 onto a pre-transfer transport 60. Transport 60 advances the sheet to sheet transport 48. The sheet is advanced by transport 60 in synchronism with the movement of the gripper In this way, the leading edge of the sheet arrives at a preselected position, i.e. a loading zone, to be received by the open gripper. The gripper then closes securing the sheet thereto for movement therewith in a recirculating path. The leading edge of the sheet is secured releasably by the gripper. As the belts move in the direction of arrow 62, the sheet moves into contact with the photoconductive belt, in synchronism with the toner image developed thereon. At transfer zone 64, a corona generating device 66 sprays ions onto the backside of the sheet so as to charge the sheet to the proper magnitude and polarity for attracting the toner image from photoconductive belt 20 thereto. The sheet remains secured to the gripper so as to move in a recirculating path for four cycles. In this way, four different color toner images are transferred to the sheet in superimposed registration with one another. One skilled in the art will appreciate that the sheet may move in a recirculating path for up to eight cycles when the information on two original documents is being merged onto a single copy sheet. Each of the electrostatic latent images recorded on the photoconductive surface is developed with the appropriately colored toner which are transferred, in superimposed registration with one another, to the sheet to form the multi-color copy of the colored original document.

After the last transfer operation, the grippers open and release the sheet. Conveyor 68 transports the sheet, in the direction of arrow 70, to the fusing station where the transferred image is permanently fused to the sheet. The fusing station includes a heated fuser roll 74 and a pressure roll 72. The sheet 52 passes through the nip defined by fuser roll 74 and pressure roll 72. The toner image contacts fuser roll 74 so as to be affixed to the sheet. Thereafter, the sheet is advanced by forwarding roll pairs 76 to catch tray 78 for subsequent removal therefrom by the machine operator.

The last processing station in the direction of movement of belt 20, as indicated by arrow 22, is the cleaning station. A rotatably mounted fibrous brush 80 is positioned in the cleaning station and maintained in contact with photoconductive belt 20 to remove residual toner particles remaining after the transfer operation. Thereafter, lamp 82 illuminates photoconductive belt 20 to remove any residual charge remaining thereon prior to the start of the next successive cycle.

Figure 2:
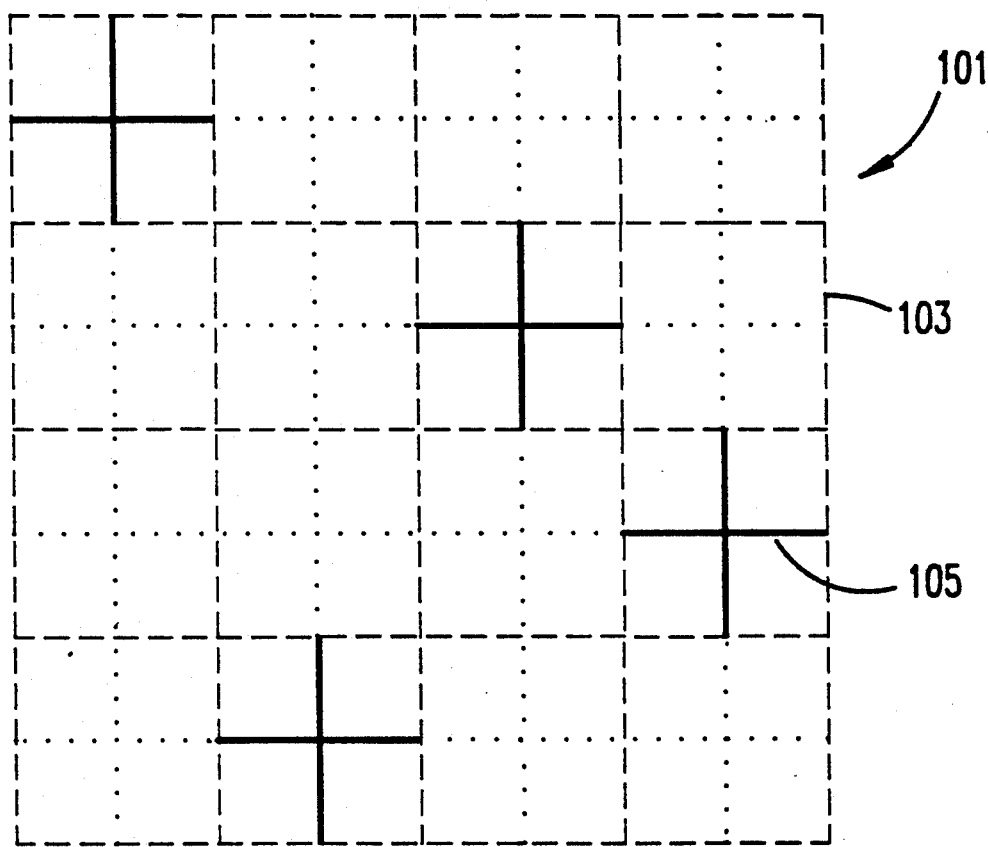
FIG. 2 is a graphical representation of the color registration test pattern of the present invention.

Referring to FIG. 2, the basic test target 101 for the color registration test for four cycles (black, magenta, cyan, and yellow) is shown. In this example, the basic test target 101 has a square shape with a length and width of 32 mm. The basic test target 101 is further divided into sixteen smaller squares 103, each having a length and width of 8 mm. Within the total area of the test target, there are a number of pixels (not shown in detail) that an image writing device will allow to be developed and printed on a transfer medium, such as a piece of paper. The actual dimensions for these pixels is determined by the precision of the ROS 16 (FIG. 1). For the purposes of this disclosure, each pixel has a width of 62.5 $\mu$m.

The design of the test target 101 comprises four cross hair FIGS. 105. Each cross hair FIG. 105 is made up of two intersecting "lines" of pixels in one of the smaller squares 103. Each of these lines is two pixels wide. It should be noted that other figure shapes may be used instead of straight lines. For instance, a circle figure having line width of two pixels would achieve acceptable results.

Referring back to FIG. 1, a test pattern is generated in the image processing system 12 in response to inputs entered at the user interface 14. In this embodiment, the electronic reprographic system of FIG. 1 is a write white system where pixels that are turned off will print and those that are turned on do not print In this embodiment, the IPS 12 first sends the appropriate signals to the ROS 16 to create the basic test target image on the photoconductive surface 20 (i.e., off pixels in the areas where the cross hair figures are to appear). It will be appreciated by one skilled in the art that the signals to create the basic test target can be generated in control circuitry included in the ROS 16 rather than the IPS 12. This step is repeated several times causing the ROS 16 to continuously duplicate the basic test target 101 across and down the photoconductive surface 20 until the output copy image is complete. In this embodiment, this first image is developed with black toner at the development station, described above.

The IPS 12 next sends the appropriate signals to the ROS 16 to create several copies of the basic test target 101 on the photoconductive surface 20 as a second image. This second image will look exactly like the first image described above except that it is shifted 8 mm in what is known as the fast scan direction. In this embodiment, this second image is developed with magenta toner at the development station. After both the first and second images are developed and transferred to a support material, a magenta cross hair figure will appear adjacent to every black cross hair figure.

The IPS 12 next sends the appropriate signals to the ROS 16 to generate separate third and fourth images on the photoconductive surface 20. The third and fourth images will look exactly like the first and second images except the third image will be shifted 16 mm and the fourth image will be shifted 24 mm, respectively, from the first image in the fast scan direction. In this embodiment, the third image is developed with cyan colored toner and the fourth image is developed with yellow colored toner at the development station. After all of the images are developed and transferred to a support material, a cyan cross hair figure will appear adjacent to every magenta one, and a yellow cross hair figure will appear adjacent to every cyan one.

The four separate images are developed by the appropriate developer unit 40, 42, 44, and 46 at the development station. The four developed images are then moved to the transfer station 48, where the toner images are transferred, in superimposed registration with one another, to a sheet of support material (e.g., a sheet of paper). These transferred images are then permanently fused to the paper at a fusing station, and the paper is furnished to a catch tray 78.

Referring to FIG. 3, a graphical representation of a test pattern is shown which would be generated when employing the steps described above. Upon close examination of the test pattern, it is readily seen that every cross hair figure of one color is adjacent to at least one cross hair figure of each of the remaining colors. For example, every black cross hair figure is adjacent to at least one magenta, one cyan, and one yellow cross hair figure. If the electronic reprographic system has perfect registration, the tips of each of the cross hair figures will line up and connect with tips of the four adjacent cross hair figures. With this test pattern, a field technician can easily determine if one of the colors is misregistered more than 125 μm. Since the line width of the cross hair figures is exactly 125 μm, a cross hair figure misregistered more than 125 μm will have one or more tips completely disconnected from the corresponding tips of the adjacent cross hair figures. Finally, color registration can be measured anywhere on the page since the basic test block 101 is repeated throughout.

What is claimed:

1. A method of testing registration in a multi-color electronic reprographic system, comprising the steps of:
   a) generating a binary code in an image processing system, said code representing on and off pixel values for a basic test target image;
   b) exposing a charged photoconductive surface with a raster output scanner and creating a first latent image in said photoconductive surface corresponding to said binary data from said image processing system;
   c) repeating steps a and b such that said basic test target is repeatedly placed across and down said photoconductive surface in said first latent image;
   d) repeating steps a, b, and c such that a separate latent image is created for each printable color in the multi-color electronic reprographic system, each latent image is shifted laterally a fixed amount relative to the previously created latent image;
   e) developing each of said latent images with a respective toner material to form a plurality of toner images; and
   f) transferring said toner images to a support material, such that registration errors in said multi-color electronic reprographic system can be examined over said substrate.

2. The method of claim 1 wherein in said generating step said basic test target comprises:
   a rectangular area incorporating a plurality of pixels which can be selectively set to on and off values; and
   a plurality of figures in said rectangular area, each of said figures including a plurality of said pixels, such that each of said figures appears as an image in said photoconductive surface.

3. The method of claim 2 wherein each of said figures comprises a horizontal line of pixels bisecting a vertical line of pixels, each of said lines having an equal length and width.

4. The method of claim 3 wherein the width of said horizontal and vertical line of pixels is equal to a maximum registration error for said electronic reprographic system.

5. The method of claim 4 wherein said rectangular area is square shaped and comprises sixteen smaller square regions, each having and an equal area, such that each of four of said smaller square regions incorporates one of said figures.

6. The method of claim 5 wherein in step d, said fixed amount is equal to a width of one of said smaller square regions.

7. The method of claim 1 wherein in step d four latent images are created on said photoconductive surface, each latent image being developed in step e with an exclusive color toner.

8. The method of claim 1, further comprising:
   performing steps a through f in response to inputs made at a user interface.

9. The method of claim 2, wherein said multi-color electronic reprographic system includes first, second, third, and fourth color toners and on said support material including said developed toner images a figure being developed with a first color toner has four adjacent figures, such that said figure being developed with a first color toner is adjacent to at least one figure being developed with said second color toner, at least one figure being developed with said third color toner, and at least one figure being developed with said fourth color toner.

10. A multi-color electronic reprographic system capable of testing color registration, comprising:
   an image processing system generating a binary code, said code representing on and off pixel values for a basic test target image;

a photoconductive surface;

a raster output scanner coupled between said image processing system and said photoconductive surface, said raster output scanner creating a first latent image in said photoconductive surface corresponding to said binary data from said image processing system, such that said pixel values of said basic test target are repeatedly placed across and down said photoconductive surface in said first latent image;

said raster output scanner creating a separate latent image in said photoconductive surface for each printable color in the multi-color electronic reprographic system, such that each latent image is shifted a fixed amount relative to the previously created latent image;

a development station coupled to said photoconductive surface, said development station including an individual developer unit for each printable color in the multi-color electronic reprographic system, such that each of said individual developer units develops one of said latent images on said photoconductive surface; and a transfer station coupled to said photoconductive surface, said transfer station transfers said developed latent images to a support material in superimposed registration with one another, such that registration errors in said multi-color electronic reprographic system can be examined over said support material.

11. The testing system of claim 10 wherein said basic test target comprises:

a rectangular area incorporating a plurality of pixels which can be selectively set to on and off values; and a plurality of figures in said rectangular area, each of said figures including a plurality of said pixels, such that each of said figures appears as an image in said photoconductive surface.

12. The testing system of claim 11 wherein each of said figures comprises a horizontal line of pixels bisecting a vertical line of pixels, each of said lines having an equal length and width.

13. The testing system of claim 12 wherein the width of said horizontal and vertical line of pixels is equal to a maximum registration error for said electronic reprographic system.

14. The testing system of claim 13 wherein said rectangular area is square shaped and comprises sixteen smaller square regions, each having and an equal area, such that each of four of said smaller square regions incorporates one of said figures.

15. The testing system of claim 14 wherein said fixed amount is equal to a width of one of said smaller square regions.

16. The testing system of claim 10 wherein four latent images are created on said photoconductive surface.

17. The testing system of claim 10 further comprising:

a user interface coupled to said image processing system, said user interface causing said image processing system to generate basic test target images in response to inputs made at the user interface.

18. The method of claim 11, wherein said multi-color electronic reprographic system includes first, second, third, and fourth color toners and on said support material including said developed toner images a figure being developed with a first color toner has four adjacent figures, such that said figure being developed with a first color toner is adjacent to at least one figure being developed with said second color toner, at least one figure being developed with said third color toner, and at least one figure being developed with said fourth color toner.

* * * * *